(12) United States Patent
Tsuji et al.

(10) Patent No.: US 12,459,077 B2
(45) Date of Patent: Nov. 4, 2025

(54) PROCESSING METHOD AND PROCESSING APPARATUS FOR WORKPIECE

(71) Applicant: SINTOKOGIO, LTD., Nagoya (JP)

(72) Inventors: Toshiya Tsuji, Nagoya (JP); Yuji Kobayashi, Nagoya (JP)

(73) Assignee: SINTOKOGIO, LTD., Nagoya (JP)

( * ) Notice: Subject to any disclaimer, the term of this patent is extended or adjusted under 35 U.S.C. 154(b) by 202 days.

(21) Appl. No.: 17/980,060

(22) Filed: Nov. 3, 2022

(65) Prior Publication Data

US 2023/0148212 A1 May 11, 2023

(30) Foreign Application Priority Data

Nov. 9, 2021 (JP) ................................. 2021-182416

(51) Int. Cl.
*B23K 20/00* (2006.01)
*B22C 9/12* (2006.01)
*B24B 39/02* (2006.01)

(52) U.S. Cl.
CPC .............. *B24B 39/026* (2013.01); *B22C 9/12* (2013.01); *B23K 20/00* (2013.01)

(58) Field of Classification Search
CPC ................ B23K 20/122; B23K 20/026; B23K 20/1225; B23K 20/123; B21C 23/211
See application file for complete search history.

(56) References Cited

U.S. PATENT DOCUMENTS

| | | | | | |
|---|---|---|---|---|---|
| 4,835,344 | A * | 5/1989 | Iyogi | ................. | H01L 23/49827 228/122.1 |
| 6,283,356 | B1 * | 9/2001 | Messelling | ........ | B23K 35/0244 228/119 |
| 6,348,273 | B1 * | 2/2002 | Ishikawa | ............... | C04B 37/025 428/432 |
| 9,162,328 | B2 * | 10/2015 | Ogasahara | ........... | B23K 35/025 |
| 10,150,709 | B2 * | 12/2018 | Minami | ................. | C04B 37/023 |
| 2001/0025417 | A1 * | 10/2001 | Fried | ....................... | F01D 5/005 29/889.7 |
| 2002/0139563 | A1 * | 10/2002 | Fujii | ......................... | H01R 4/62 174/117 A |
| 2014/0301769 | A1 * | 10/2014 | Kinoshita | ............. | B23K 20/233 228/248.1 |
| 2017/0304933 | A1 * | 10/2017 | Miles | .................... | B23K 20/122 |
| 2018/0266960 | A1 * | 9/2018 | Fujimoto | ............... | G01N 21/01 |

(Continued)

FOREIGN PATENT DOCUMENTS

| | | |
|---|---|---|
| DE | 102006054440 B3 | 12/2007 |
| DE | 102011001763 A1 | 1/2012 |

(Continued)

OTHER PUBLICATIONS

Extended European Search Report issued Mar. 9, 2023 in Application No. 22205783.8.

(Continued)

*Primary Examiner* — Erin B Saad
(74) *Attorney, Agent, or Firm* — Faegre Drinker Biddle & Reath LLP (57) ABSTRACT

A processing method according to one aspect incudes preparing a metal workpiece having a hole that opens to a surface thereof, filling the hole with processing media, and applying an external force to the processing media to apply a compressive residual stress to an inner surface of the hole.

7 Claims, 10 Drawing Sheets

(56) References Cited

U.S. PATENT DOCUMENTS

| | | | |
|---|---|---|---|
| 2019/0111513 A1* | 4/2019 | Rose | B23K 20/128 |
| 2020/0276548 A1 | 9/2020 | Koyama et al. | |
| 2022/0266376 A1* | 8/2022 | Ano | C23C 14/34 |
| 2022/0281005 A1* | 9/2022 | Kandasamy | B21C 23/002 |

FOREIGN PATENT DOCUMENTS

| | | |
|---|---|---|
| JP | S54-125135 A | 9/1979 |
| JP | S60-195186 U | 12/1985 |
| JP | H03-104556 A | 5/1991 |
| JP | 2000-312981 A | 11/2000 |
| JP | 2003-159648 A | 6/2003 |
| JP | 6036704 B2 | 11/2016 |
| WO | WO-2013/099411 A1 | 7/2013 |
| WO | WO-2018/134063 A1 | 7/2018 |
| WO | 2019/044437 A1 | 3/2019 |

OTHER PUBLICATIONS

Japanese Office Action issued Apr. 22, 2025 in Application No. 2021-182416.
Japanese Office Action issued Aug. 5, 2025 in Application No. 2021-182416.

* cited by examiner

PROCESSING METHOD AND PROCESSING APPARATUS FOR WORKPIECE

CROSS-REFERENCE TO RELATED APPLICATIONS

This application is based on and claims the benefit of priority from Japanese Patent Application No. 2021-182416 filed on Nov. 9, 2021, the entire contents of which are incorporated herein by reference.

TECHNICAL FIELD

The present disclosure relates to a processing method and a processing apparatus for a workpiece.

BACKGROUND

Metal part such as mold or turbine is formed with hole, such as water cooling hole. Since an inner surface of the water cooling hole is always exposed to cooling water flowing through the water cooling hole, corrosion is likely to occur on the inner surface of the water cooling hole. In addition, thermal stress is repeatedly generated on the inner surface of the metal part due to a temperature difference between the outer surface of the metal part and the inner surface of the cooling hole cooled by the cooling water. Therefore, the inner surface of the water cooling hole is prone to stress corrosion cracking and other damage.

In order to prevent damage to the metal part, a technique is known to increase fatigue strength of the inner surface of the water cooling hole by applying compressive residual stress to the inner surface. For example, Patent Literature 1 describes that a nozzle is inserted into a water cooling hole of a mold and injecting shot media from a tip of the nozzle to perform shot peening on an inner surface of the water cooling hole. In this method, compressive residual stress is applied to the inner surface of the water cooling hole by collision of the shot media with the inner surface.

Further, Patent Literature 2 describes a burnishing tool for performing burnish treatment on an inner surface of a machined hole. The burnishing tool includes a cylindrical retainer, a plurality of rollers that are rotatable about an axis and are capable of protruding from the retainer in a radial direction, and a mandrel that rotates about the axis and causes the plurality of rollers to protrude from the retainer. In this burnishing tool, the mandrel is rotated inside the machined hole to strike and roll the inner surface of the machined hole with the rollers. As a result, the inner surface of the machined hole is plastically deformed, and compressive residual stress is applied to the inner surface of the machined hole.

PRIOR ART DOCUMENT

Patent Literature

Patent Literature 1: Japanese Patent No. 6036704
Patent Literature 2: Japanese Unexamined Patent Application Publication No. 2003-159648

SUMMARY

In the method described in Patent Literature 1, for example, when the water cooling hole having a complicated shape such as being curved in the depth direction is formed in the mold, it is required to use a special nozzle that can be inserted into the water cooling hole having the complicated shape. Further, since the burnishing tool described in Patent Literature 2 extends linearly in the axial direction, it is difficult to insert the burnishing tool into the machined hole having a complicated shape. Therefore, it is difficult to uniformly process the inner surface of a machined hole having a complicated shape using this burnishing tool.

Therefore, an object of the present disclosure is to provide a processing method and a processing apparatus for a workpiece capable of applying compressive residual stress to an inner surface of a hole regardless of the shape of the hole.

A processing method according to one aspect includes preparing a metal workpiece having a hole that opens to a surface thereof, filling the hole with processing media, and applying an external force to the processing media to apply a compressive residual stress to an inner surface of the hole.

According to the present disclosure, compressive residual stress can be applied to an inner surface of a hole regardless of the shape of the hole.

DETAILED DESCRIPTION

Summary of Embodiments of the Present Disclosure

First, a summary of embodiments of the present disclosure will be described.

(Clause 1) A processing method, comprising preparing a metal workpiece having a hole that opens to a surface thereof, filling the hole with processing media, and applying an external force to the processing media to apply a compressive residual stress to an inner surface of the hole.

In the above aspect, when an external force is applied to the processing media filled in the hole, the external force is transmitted to the inner surface of the hole via the processing media. At this time, the external force substantially uniformly acts on the inner surface of the hole, and compressive residual stress is applied to the inner surface of the hole. Therefore, in this processing method, by applying the external force to the inner surface of the hole via the processing media, compressive residual stress can be applied to the inner surface of the hole regardless of the shape of the hole.

(Clause 2) The processing method according to clause 1, further comprising, inserting a pressing member into the hole, and applying a load to the pressing member inserted into the hole to apply the external force to the processing media.

In the above aspect, the external force applied to the pressing member is transmitted to the inner surface of the hole via the processing media. By this external force, compressive residual stress can be applied to the inner surface of the hole.

(Clause 3) The processing method according to clause 2, further comprising dropping a hammer against the pressing member to apply the load to the pressing member.

In the above aspect, since the load is applied from the hammer to the pressing member and the external force acts on the inner surface of the hole via the processing media, compressive residual stress can be applied to the inner surface of the hole.

(Clause 4) The processing method according to any one of clauses 1 to 3, comprising stirring the processing media within the hole.

In the above aspect, by stirring the processing media within the hole, the compressive residual stress applied to the inner surface of the hole can be increased.

(Clause 5) The processing method according to any one of clauses 1 to 4, further comprising filling the hole with a powder containing a metal material to be attached to the inner surface of the hole before applying the external force to the processing media.

In the above aspect, by applying the external force to the processing media after filling with the powder containing the metal material, the powder is pressed against the inner surface of the hole, and the film containing the metal material can be formed on the inner surface of the hole.

(Clause 6) A processing apparatus for processing an inner surface of a hole formed in a metal workpiece, the processing apparatus comprising, a pressing member inserted into the hole filled with processing media, and an external force applying device to apply an external force to the processing media through the pressing member.

In the above aspect, by applying the external force to the pressing member, the external force is applied from the processing media to the inner surface of the hole. At this time, the external force substantially uniformly acts on the inner surface of the hole, and compressive residual stress is applied to the inner surface of the hole. Therefore, according to this processing apparatus, compressive residual stress can be applied to the inner surface of the hole regardless of the shape of the hole.

(Clause 7) The processing apparatus according to clause 6, wherein the external force applying device includes a hammer disposed above the pressing member, and a lifting unit to move the hammer in a vertical direction, wherein when the hammer is lowered, the hammer collides with the pressing member to apply a load toward a depth direction of the hole to the pressing member.

In the above aspect, since the load is applied from the hammer to the pressing member, the external force is applied to the inner surface of the hole via the processing media. Therefore, compressive residual stress can be applied to the inner surface of the hole.

(Clause 8) The processing apparatus according to clause 6 or 7, wherein the pressing member includes a cylindrical main body and a stirring pin extending parallel to a central axis of the main body from the main body, and wherein the stirring pin is coupled to the main body at a position offset from the central axis of the main body.

In the above aspect, since the stirring pin is coupled to the main body at a position offset from the central axis of the main body, when the main body rotates around the central axis, the stirring pin revolves inside the hole along the circumference around the central axis. As a result, the processing media filled in the hole is agitated and stirred by the stirring pin. By stirring the processing media, the compressive residual stress applied to the inner surface of the hole can be increased.

Exemplary Embodiments of the Present Disclosure

Hereinafter, embodiments of the present disclosure will be described with reference to the drawings. In the description based on the drawings, the same elements or elements having the same functions are denoted by the same reference numerals, and redundant description is omitted. In the drawings, some parts may be simplified or exaggerated for easy understanding, and dimensional ratios, angles, and the like are not limited to those described in the drawings.

A processing method according to the present disclosure applies compressive residual stress to an inner surface of a hole formed in a workpiece. Examples of the workpiece include metal part that requires high fatigue strength and wear resistance, such as a mold or a turbine. Although not limited thereto, the metal part is formed of an iron-based alloy containing iron as a main component, an aluminum alloy, or the like. The iron-based alloy is, for example, a steel material. Typically, quenched and tempered martensitic steel is used for the metal member made of steel, but raw material which have not been subjected to heat treatment may be used.

The workpiece may be a block-shaped metal part, or may be a multilayer molded article formed three dimensionally by laminating a plurality of metal layers. A hole such as a water cooling hole is formed in the workpiece. The hole formed in the workpiece is not limited to the water cooling hole. In the following description, an example in which a mold having a water cooling hole is adopted as a workpiece will be described.

Figure 1:
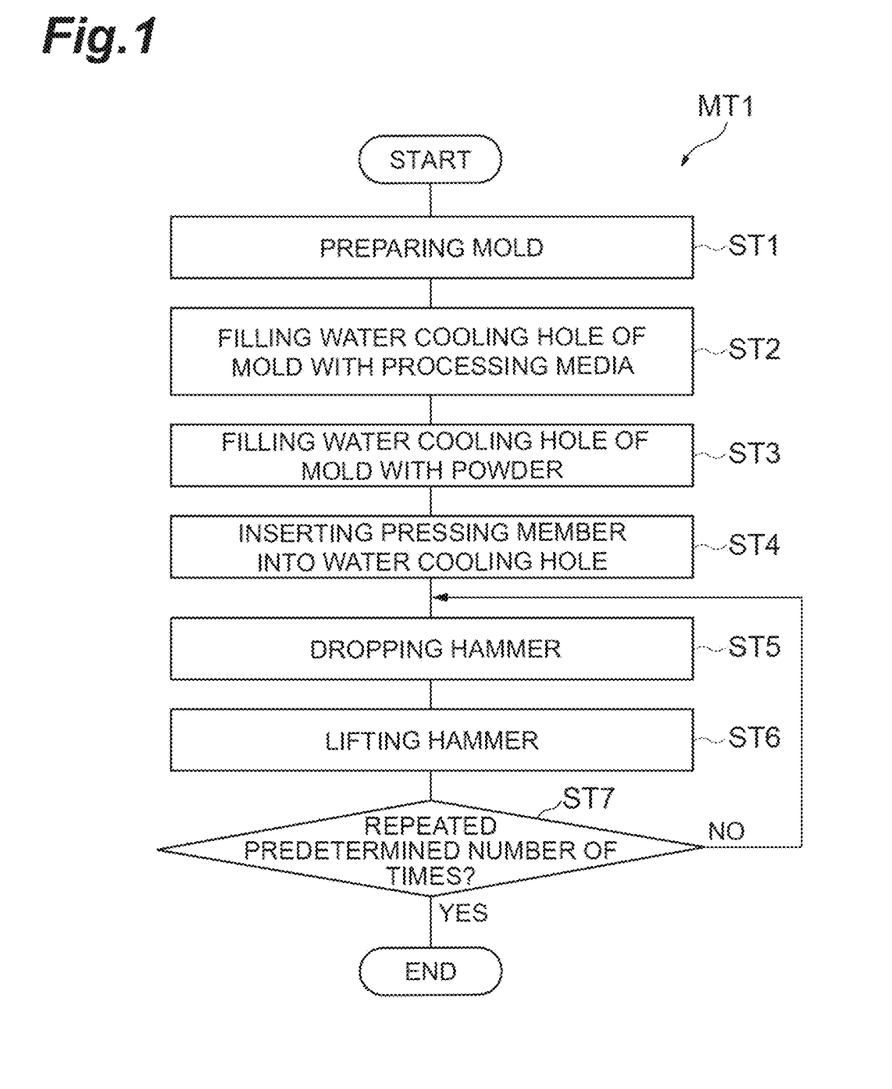
FIG. 1 is a flowchart illustrating a processing method for a workpiece according to one embodiment.

FIG. 1 is a flow chart illustrating a processing method MT1 according to one embodiment. In the processing method MT1 illustrated in FIG. 1, a mold 10 which is an example of the workpiece is prepared (Step ST1).

Figure 2:
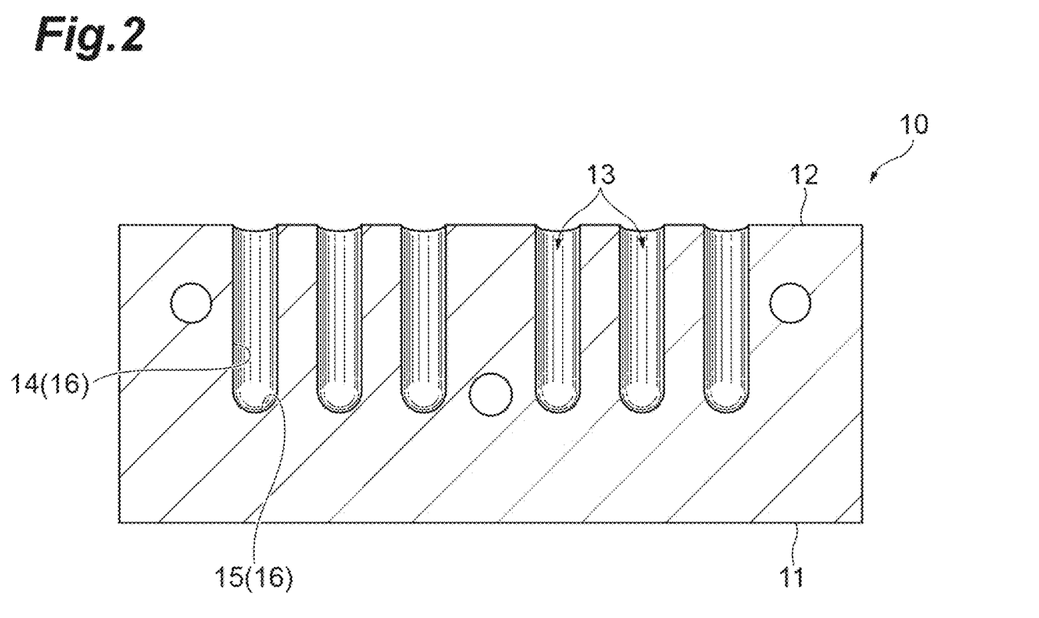
FIG. 2 is a cross-sectional view of an exemplary workpiece.

FIG. 2 is a cross-sectional view of an example of the mold 10 prepared in the step ST1. The mold 10 is, for example, a steel mold for die casting. Die casting is a type of mold casting method in which molten metal is pressed into a mold to mass-produce high-precision castings. A nitriding treatment may be applied on the surface of the mold 10. The nitriding treatment is a method of heating the mold 10 in a nitriding gas such as ammonia gas to form a nitrided layer on the surface of the mold 10. By applying nitriding treatment on the mold 10, distortion of the mold 10 due to heat is suppressed.

As shown in FIG. 2, the mold 10 is a block-shaped steel material having a first surface 11 and a second surface 12. A cavity, which is a space corresponding to a product shape, is formed on the first surface 11 of the mold 10. A plurality of water cooling holes 13 that open to the second surface 12 are formed in the mold 10. The plurality of water cooling holes 13 are bottomed holes, and the mold 10 is cooled by cooling water flowing through the water cooling holes 13 during casting using the mold 10. Each of the plurality of water cooling holes 13 has a side surface 14 and a bottom surface 15. The side surface 14 and the bottom surface 15 constitute an inner surface 16 defining the water cooling hole 13. Since thermal stress is repeatedly generated on the inner surface 16 of the water cooling hole 13 due to a temperature difference between the first surface 11 of the mold 10 and the inner surface 16 of the water cooling hole 13, stress corrosion cracking is particularly likely to occur on the inner surface 16 of the water cooling hole 13.

As shown in FIG. 2, the plurality of water cooling holes 13 extend from the second surface 12 of the mold 10 to a position before the first surface 11. The water cooling hole 13 has a circular cross-sectional shape and has a substantially constant diameter in the entire region in a depth direction of the water cooling hole 13. The water cooling hole 13 may have an any cross-sectional shape such as an elliptical shape or a polygonal shape, and the cross-sectional area of the water cooling hole 13 may change continuously or stepwise in the depth direction. In the embodiment shown in FIG. 2, the water cooling hole 13 extends linearly in the thickness direction of the mold 10, but the water cooling hole 13 may be curved inside the mold 10.

Figure 3:
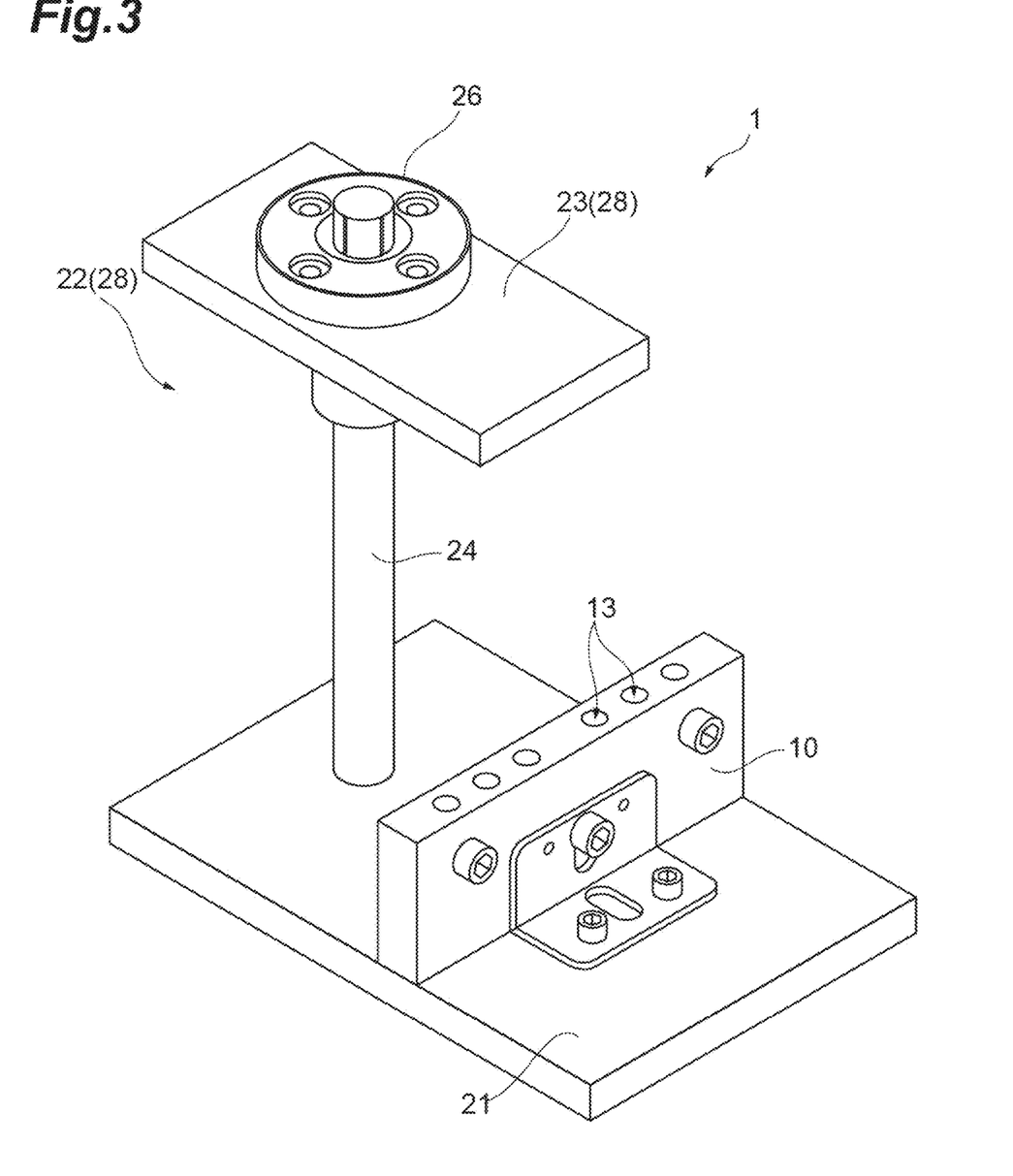
FIG. 3 is a perspective view schematically illustrating a processing apparatus according to one embodiment.
Figure 4A:
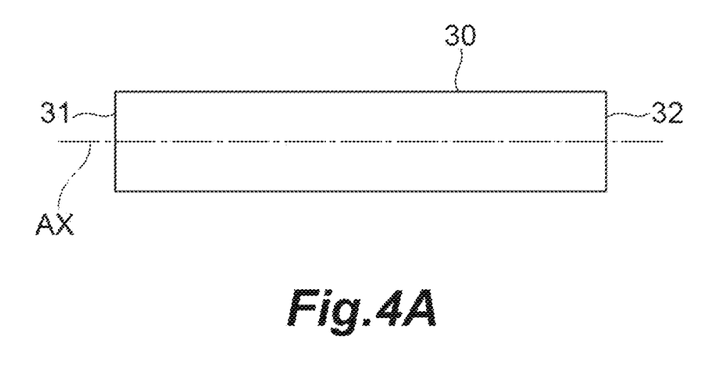
FIG. 4A is a side view of an exemplary pressing member.
Figure 4B:
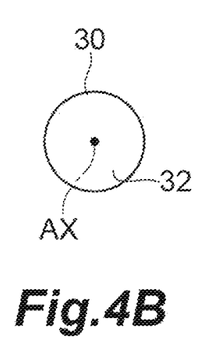
FIG. 4B is a bottom view of an exemplary pressing member.

Next, a processing apparatus used in the processing method MT1 will be described with reference to FIGS. 3, 4A and 4B. FIG. 3 is a perspective view schematically illustrating a processing apparatus 1 according to an embodiment. FIGS. 4A and 4B show a pressing member 30 which is part of the processing apparatus 1. The processing apparatus 1 includes a base plate 21, an external force applying device 28, and a pressing member 30.

The base plate 21 provides a support surface for placing the mold 10 thereon. The mold 10 is placed on and fixed to the base plate 21 with the openings of the plurality of water cooling holes 13 facing upward.

The external force applying device 28 applies an external force to processing media 25 via a pressing member 30, and includes a lifting unit 22 and a hammer 23. The lifting unit 22 is a linear motion mechanism that moves the hammer 23 in the up-down direction (vertical direction). The lifting unit 22 has a spline shaft 24 and a ball spline 26. The spline shaft 24 stands on the base plate 21 and extends in the up-down direction. The ball spline 26 has an annular shape surrounding the spline shaft 24. The ball spline 26 has a plurality of rotatable rolling elements, and is movable along the spline shaft 24 by rolling of the plurality of rolling elements. The lifting unit 22 may further include a stopper that fixes the position of the ball spline 26 in the up-down direction. The lifting unit 22 holds the hammer 23 above the mold 10 in an initial state.

The hammer 23 is a metal plate, for example, and functions as a weight that applies a load to the pressing member 30 in the depth direction of the water cooling hole 13. A portion of the hammer 23 is located above the plurality of water cooling holes 13 of the mold 10. The hammer 23 is connected to the ball spline 26 so as to be movable in the up-down direction above the mold 10. When the fixing of the ball spline 26 is released, the hammer 23 falls (descends) toward the mold 10 together with the ball spline 26.

FIG. 4A is a side view of an exemplary pressing member 30, and FIG. 4B is a bottom view of the pressing member 30. The pressing member 30 is a metal member having a substantially cylindrical shape and extends along the central axis AX between one end 31 and the other end 32. The length of the pressing member 30 is formed to be longer than the depth of the water cooling hole 13 (the distance between the second surface 12 of the mold 10 and the bottom surface 15 of the water cooling hole 13 in the thickness direction of the mold 10). The pressing member 30 has a diameter smaller than that of the water cooling hole 13. In order to efficiently apply force to the processing media 25, the diameter of the pressing member 30 may be 50% or more, 60% or more, 70% or more, 80% or more, or 90% or more of the diameter of the water cooling hole 13. Accordingly, the pressing member 30 may be inserted into the water cooling hole 13.

Reference is again made to FIG. 1. The mold 10 prepared in step ST1 is fixed on the base plate 21 with the openings of the plurality of water cooling holes 13 facing upward. Then, the plurality of water cooling holes 13 of the mold 10 are filled with the processing media 25 (Step ST2). The processing media 25 is abrasive grains such as an abrasive that applies residual stress to the mold 10. The material of the processing media 25 is selected according to the workpiece from various materials such as metal (for example, iron, zinc or stainless steel), ceramic (for example, alumina, silicon carbide or zircon), glass, and resin (for example, nylon resin, melamine resin or urea resin). The shape of the abrasive is selected from various shapes such as a spherical shape, a polygonal shape, and a cylindrical shape. Typically, steel balls having diameters of about 0.2 mm to 1.2 mm are used as the processing media 25.

In one embodiment, the plurality of water cooling holes 13 of the mold 10 may be filled with the processing media 25 and the powder containing a metal material to be attached to the inner surfaces of the water cooling holes 13 (Step ST3). For example, when a zinc film is required to be formed on the inner surface 16 of the plurality of water cooling holes 13, the plurality of water cooling holes 13 of the mold 10 may be filled with powdered zinc.

Next, the pressing member 30 is inserted into each water cooling hole 13 filled with the processing media 25 (Step ST4). At this time, the pressing member 30 is inserted into the water cooling hole 13 in a state in which the other end 32 of the water cooling hole 13 faces the bottom surface 15 of the water cooling hole 13. Accordingly, the one end 31 of the pressing members 30 is disposed above the second surface 12 while being exposed from the mold 10, and the other end 32 of the pressing member 30 is disposed inside the water cooling holes 13 while being in contact with the processing media 25.

Figure 5:
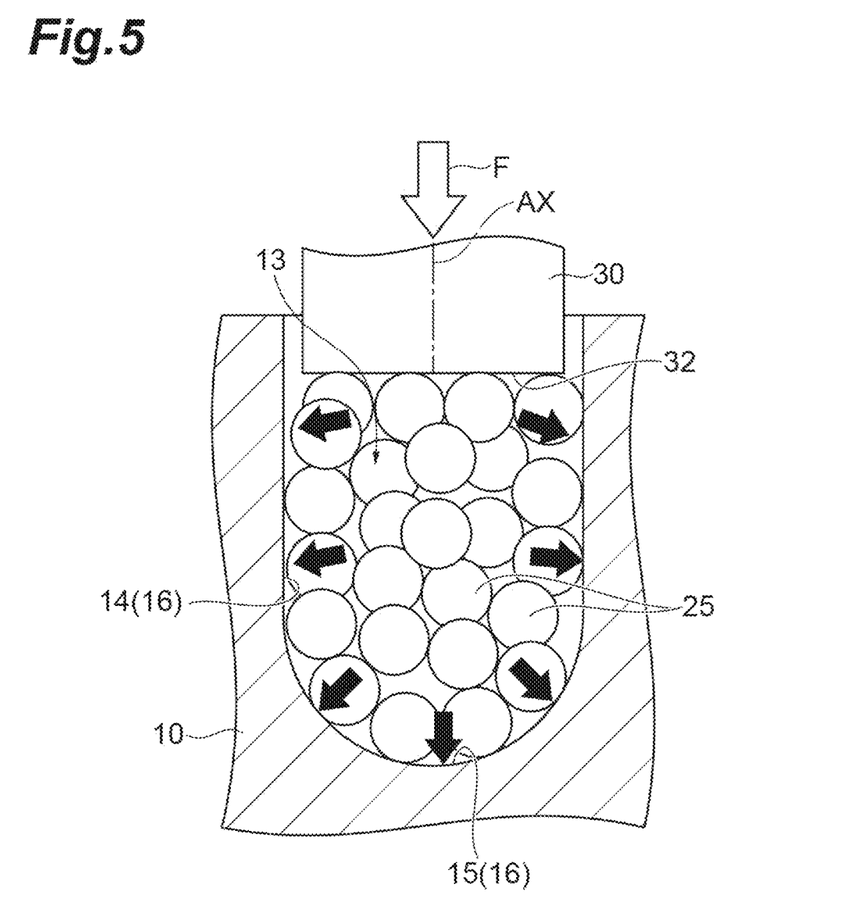
FIG. 5 is a diagram schematically illustrating a force acting on an inner surface of a water cooling hole.

Next, the fixing of the ball spline 26 is released so that the hammer 23 disposed above the mold 10 is dropped toward the pressing member 30 (Step ST5). As shown in FIG. 5, the dropped hammer 23 collides with the one end 31 of the pressing member 30 to apply a load F toward the bottom surface 15 of the water cooling hole 13 to the pressing member 30. The load F applied to the pressing member 30 is transferred to the processing media 25, and the processing media 25 is pressurized in the water cooling hole 13. As a result, the inner surface 16 of the water cooling hole 13 is pressed by the processing media 25. When the external force is applied from the processing media 25, the inner surface 16 of the water cooling hole 13 is plastically deformed, and compressive residual stress is applied to the inner surface 16. At this time, since the force transmitted from the processing media 25 substantially uniformly acts on the inner surface 16 of the water cooling hole 13, the compressive residual stress is applied to the inner surface 16 with high uniformity.

In addition, in a case where the plurality of water cooling holes 13 of the mold 10 are filled with powder containing zinc together with the processing media 25, the powder is pressed against the inner surface 16 of the water cooling hole 13 when the force is applied from the processing media 25 to the inner surface 16, and the powdered zinc is attached to the inner surface 16. As a result, a zinc film is formed on the inner surface 16. By forming the zinc film on the inner surface 16 of the water cooling hole 13, corrosion of the inner surface 16 due to the cooling water circulating through the water cooling hole 13 can be suppressed. As a result, it is possible to suppress disappearance of the compressive residual stress layer from the inner surface 16 due to erosion of the inner surface 16.

Next, the hammer 23 is lifted by the lifting unit 22 (step ST6). The position of the lifted hammer 23 is determined according to the compressive residual stress to be applied to the inner surface 16 of the water cooling hole 13. Next, it is determined whether or not the drop of the hammer 23 has been repeated a predetermined number of times (step ST7). When the number of the drops of the hammer 23 is less than the predetermined number of times, the step ST5 and the step ST6 are repeated until the number of the drops reaches the predetermined number to apply the load F to the pressing member 30. When the number of the drops of the hammer 23 reaches the predetermined number, the processing method MT1 according to an embodiment is ended.

As described above, in the processing method MT1, an external force is applied to the processing media 25 filled in the water cooling hole 13 of the mold 10 through the pressing member 30. The external force applied to the processing media 25 substantially uniformly acts on the inner surface 16 of the water cooling hole 13 to apply compressive residual stress to the inner surface 16 of the water cooling hole 13 with high uniformity. Therefore, according to this processing method MT1, it is possible to apply compressive residual stress to the inner surface 16 of the water cooling hole 13 regardless of the shape of the water cooling hole 13.

In general shot peening, when shot media collide with a workpiece, a damage such as a dent called a tool mark may be generated. When the tool mark is formed on the inner surface 16 of the water cooling hole 13, stress is concentrated on a portion where the tool mark is formed, and the portion may become a starting point of cracking of the mold 10. In the processing method MT1, a large surface pressure may be applied to the inner surface 16 of the water cooling hole 13 by repeatedly applying the load F to the pressing member 30. Accordingly, the unevenness of the inner surface 16 of the water cooling hole 13 may be leveled and the tool mark causing the damage of the mold 10 may be removed.

Figure 6:
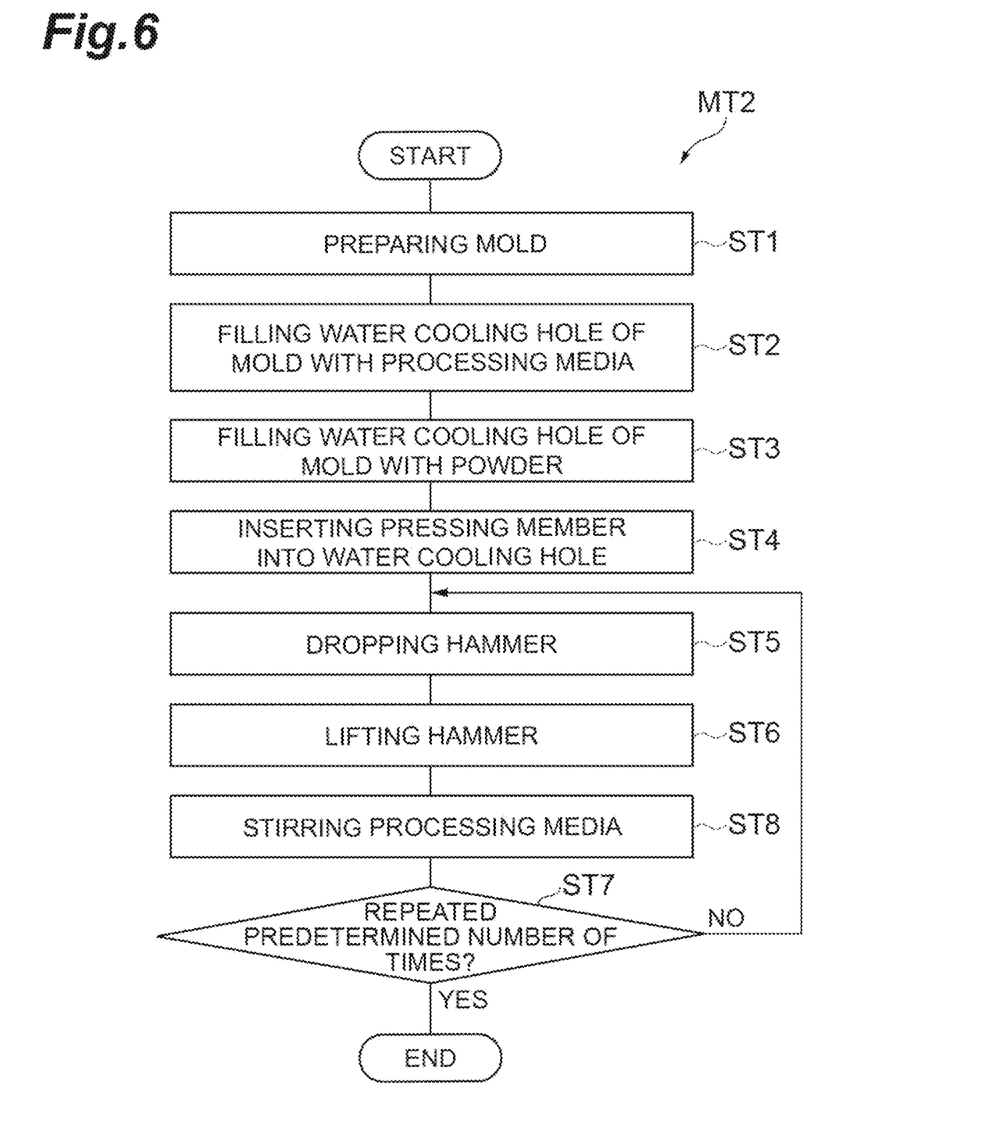
FIG. 6 is a flowchart illustrating a processing method for a workpiece according to another embodiment.

Next, a processing method of a workpiece according to another embodiment will be described. Hereinafter, differences from the above-described processing method MT1 will be mainly described, and redundant description will be omitted. FIG. 6 is a flowchart illustrating a processing method MT2 of a workpiece according to another embodiment. As shown in FIG. 6, the processing method MT2 differs from the processing method MT1 shown in FIG. 2 in that it further includes a step of stirring the processing media 25.

Figure 7A:
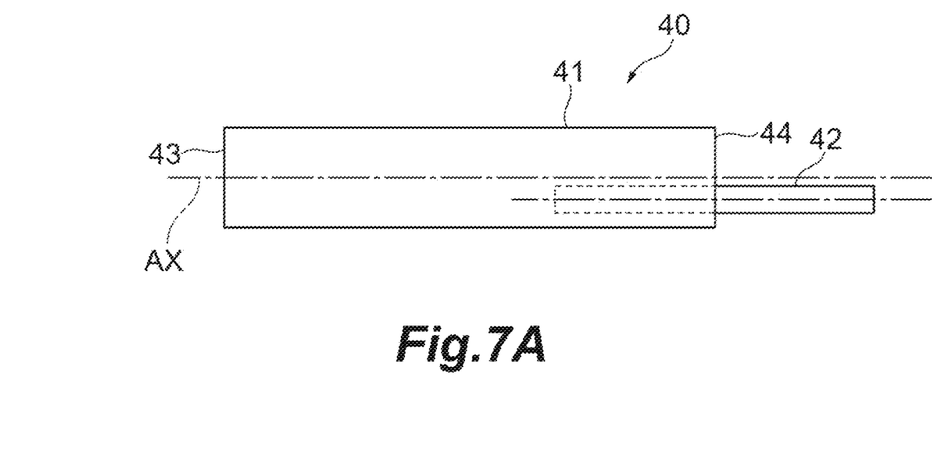
FIG. 7A is a side view of another variation of a pressing member.
Figure 7B:
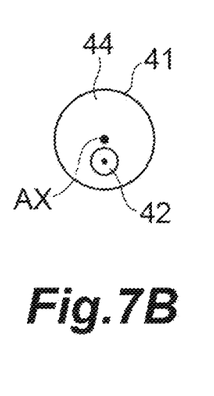
FIG. 7B is a bottom view of another variation of a pressing member.

In the processing method MT2, the pressing member 40 is used to apply an external force to the processing media 25. FIG. 7A is a side view of the pressing member 40, and FIG. 7B is a bottom view of the pressing member 40. As shown in FIGS. 7A and 7B, the pressing member 40 includes a main body 41 and a stirring pin 42. The main body 41 is a metallic member having a substantially cylindrical shape and extends along the central axis AX between one end 43 and the other end 44. The length of the pressing member 40 in the direction along the central axis AX is longer than the depth of the water cooling hole 13. The pressing member 40 has a diameter smaller than that of the water cooling hole 13. Accordingly, the pressing member 40 may be inserted into the water cooling hole 13.

The stirring pin 42 has a substantially cylindrical shape and has a diameter smaller than that of the main body 41. The stirring pin 42 extends from the other end 44 of the main body 41 in a direction parallel to the central axis AX, and is coupled to the main body 41 at a position offset from the central axis AX in the radial direction. Therefore, when the main body 41 rotates around the central axis AX, the stirring pin 42 revolves along a circumference around the central axis AX.

As shown in FIG. 6, the processing method MT2 includes a step of stirring the processing media 25 filled in the plurality of water cooling holes 13 (Step ST8). The stirring of the processing media 25 is performed, for example, by rotating the main body 41 of the pressing member 40 about the central axis AX after lifting the hammer 23. In the step ST8, the operator may manually rotate the pressing member 40, or may rotate the pressing member 40 using a power source such as a motor. When the main body 41 rotates around the central axis AX, the stirring pin 42 revolves along a circumference around the central axis AX. As a result, the processing media 25 is agitated and stirred in the water cooling hole 13.

Figure 8:
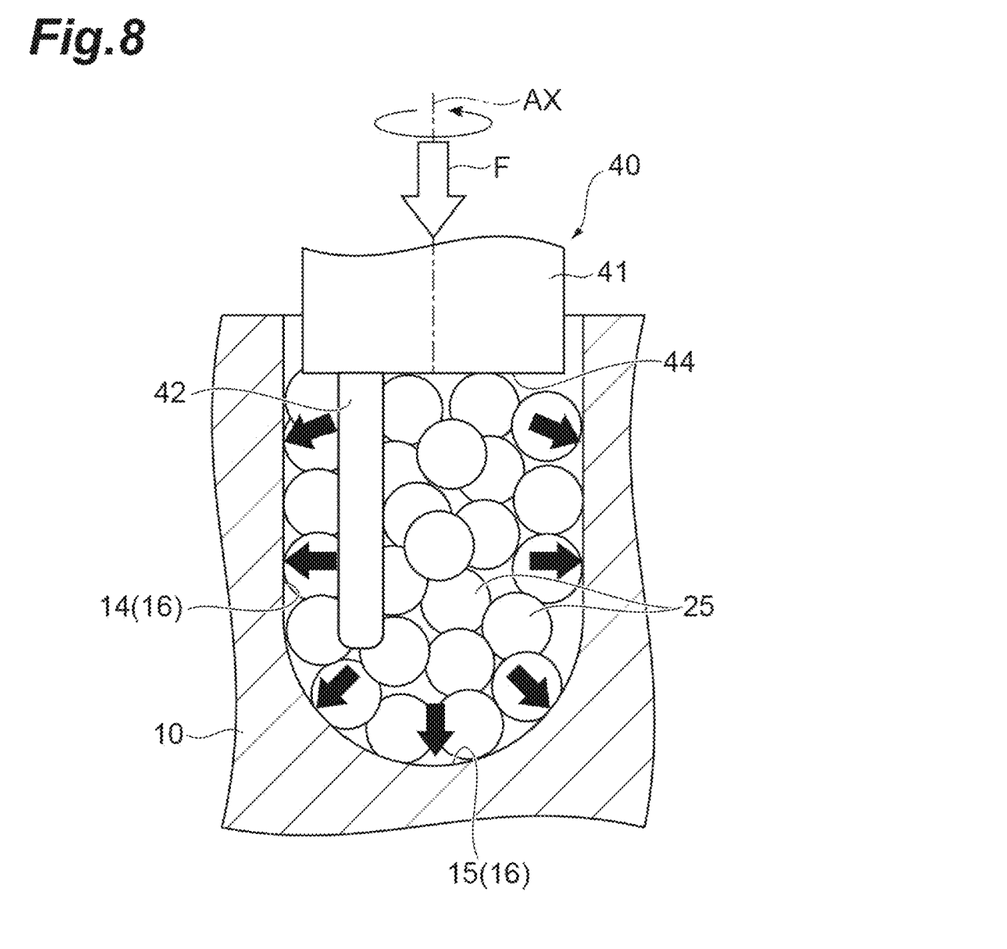
FIG. 8 is a diagram schematically illustrating a force acting on an inner surface of a water cooling hole.

In one embodiment, as shown in FIG. 8, the pressing member 40 may be rotated about the central axis AX in a state where the load F is applied to the pressing member 40 by the hammer 23 or the like. By rotating the pressing member 40 to stir the processing media 25 in the water cooling hole 13, the processing media 25 may be uniformly brought into contact with the inner surface 16 of the water cooling hole 13, thereby improving the uniformity of the compressive residual stress applied to the inner surface 16. Further, by applying an external force to the inner surface 16 while stirring the processing media 25, the unevenness of the inner surface 16 of the water cooling hole 13 is leveled, and the tool mark can be removed from the inner surface 16.

In the processing method MT2, it is determined whether or not dropping of the hammer 23 is repeated a predetermined number of times after stirring of the processing media 25 (step ST7). When the number of the drops of the hammer 23 is less than the predetermined number, the step ST5, the step ST6 and the step ST8 are repeated until the predetermined number is reached. When the number of the drops of the hammer 23 reaches the predetermined number, the processing method MT2 is ended.

As described above, according to the processing method MT2, the compressive residual stress may be applied to the inner surface 16 of the water cooling hole 13 regardless of the shape of the water cooling hole 13. The method of stirring the processing media 25 is not limited to the above-described example, and the processing media 25 may be stirred in the water cooling hole 13 by applying vibration, for example. Even when the processing media 25 is stirred by vibration, the uniformity of the compressive residual stress applied to the inner surface 16 can be improved.

Next, effects of the processing method for a workpiece described above will be described based on examples, but the processing method of the present disclosure is not limited to the following examples.

Example 1

First, in Example 1, a test piece made of alloy steel specified by JIS (Japanese Industrial Standards) SKD61 was prepared, and a plurality of holes each having a circular cross-section with a diameter of 6 mm and a depth of 25 mm were formed in the test piece. The test piece was then subjected to quenching and tempering.

In Example 1, the plurality of holes of the test piece were filled with steel balls made of JIS SUJ2 as processing media. The diameter of the steel balls was 1.0 mm, and the Vickers hardness of the steel balls was 62. Then, the pressing member 30 shown in FIGS. 4A and 4B was inserted into the plurality of holes filled with the steel balls, and the hammer 23 was dropped toward the pressing member 30 using the processing apparatus 1 shown in FIG. 3. The dropping height of the hammer 23 was set to 100 mm. The sum of the masses of the hammer 23 and the ball spline 26 was 1.34 kg.

In Example 1, the mold 10 was processed by changing the number of drops of the hammer 23 (i.e., the number of hammering times), and the residual stress applied to the inner surface of the plurality of holes was measured by an X-ray diffraction method. Residual stress was measured at a position on the side surface 12.5 mm away from the bottom surface of the hole.

The measurement conditions of the residual stress by the X-ray diffraction method were as follows.
   Residual stress analysis method: cos a method
   Characteristic X-ray: Cr-Kα
   Diffraction surface: Fe, 211
   Diffraction angle: 156.396 [deg]
   Voltage: 30 [kV]
   Current: 1 [mA]
   X-ray elastic constant: 224 [GPa]
   Poisson's ratio: 0.28
   X-ray incident angle: 35 [deg]
   X-ray irradiation diameter: 3 [mm]
   X-ray irradiation time: 30 [s]

Figure 9:
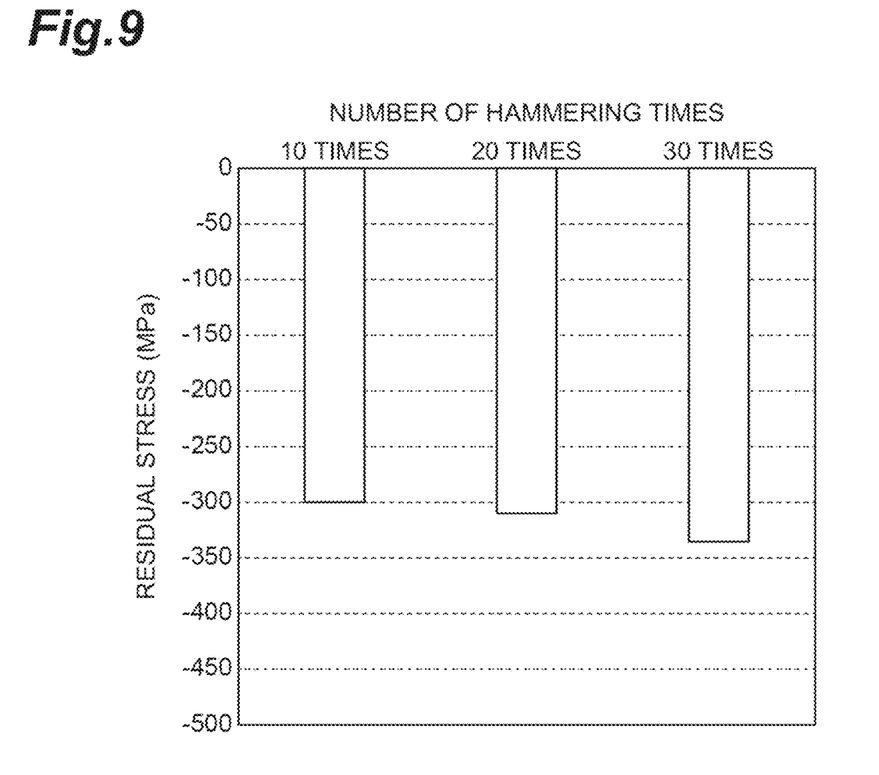
FIG. 9 is a graph showing the relationship between the number of hammering times and residual stress.

FIG. 9 is a graph showing the relationship between the number of hammering times and the residual stress applied to the inner surface of the hole of the test piece. In FIG. 9, the tensile residual stress is represented as a positive value, and the compressive residual stress is represented as a negative value. As shown in FIG. 9, in Example 1, it was confirmed that compressive residual stress was applied to the inner surface of the hole regardless of the number of hammering times. In addition, it was confirmed that the compressive residual stress applied to the inner surface of the hole increases as the number of hammering increases.

Example 2

In Example 2, the pressing member 40 shown in FIGS. 7A and 7B was inserted into the plurality of holes filled with the same steel balls as in Example 1, and the processing apparatus 1 shown in FIG. 3 was used to cause the hammer 23 to collide with the pressing member 40 a predetermined number of times. In addition, in Example 2, the pressing member 40 was rotated once or a plurality of times to stir the steel balls inside the hole while the hammer 23 collided with the pressing member 40 the predetermined number of times. Except for this point, the test piece was processed under the same conditions as in Example 1, and the residual stress applied to the inner surface of the plurality of holes was measured by the X-ray diffraction method.

Figure 10:
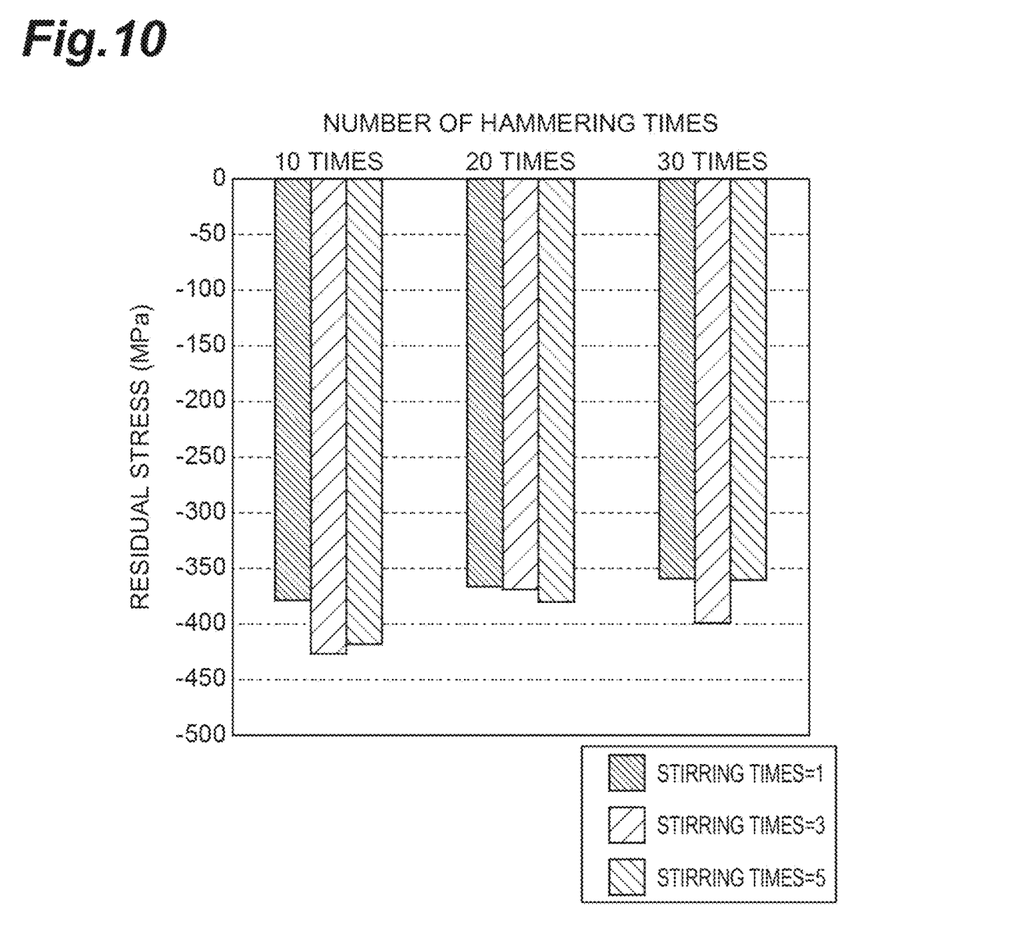
FIG. 10 is a graph showing the relationship between the number of stirring times and residual stress.

FIG. 10 is a graph showing the relationship between the number of stirring times of the steel balls and the residual stress applied to the inner surface of the hole. As shown in FIG. 10, it was confirmed that by making the hammer 23 collide with the pressing member 40 while stirring the steel balls, a larger compressive residual stress can be applied as compared with the case where the steel balls are not stirred.

Although the processing methods for a workpiece according to various embodiments have been described above, the present invention is not limited to the above-described embodiments, and various modifications can be made without departing from the scope of the present invention.

For example, although the compressive residual stress is applied to the inner surface 16 of the water cooling hole 13 formed in the mold 10 in the above-described embodiment, the compressive residual stress may be applied to the inner surface of a hole other than the water cooling hole. Although the water cooling hole 13 described above is a bottomed hole, the water cooling hole 13 may be a through hole. For example, the processing media 25 may be filled into a through hole which is placed on the base plate 21 and whose bottom opening is closed, and an external force may be applied to the processing media 25.

Further, in the above-described processing methods MT1 and MT2, the powder is filled in the plurality of water cooling holes 13, but the powder does not necessarily have to be filled. When a load is applied to the pressing member 30 or 40 in a state in which the processing media 25 is filled, compressive residual stress may be applied to the inner surface 16 of the water cooling hole 13. Further, as long as the external force can be applied to the processing media 25, the shape of the pressing members 30 and 40 is not limited to the shape shown in FIGS. 4A and 4B or FIGS. 7A and 7B, and may have any shape. For example, the pressing member may have a conical shape of which the diameter decreases toward the bottom surface 15.

In the above-described embodiment, the external force applying device 28 drops the hammer 23 to apply a load to the pressing member 30. However, the external force applying device 28 may apply an external force to the processing media 25 without using the hammer 23. For example, the external force applying device 28 may press the pressing member 30 toward the bottom surface 15 of the water cooling hole 13 by using a hydraulic actuator such as a hydraulic cylinder. Further, in the processing methods MT1 and MT2, an external force is applied to the processing media 25 via the pressing member 30 or 40, but the pressing member 30 or 40 may not necessarily be used. For example, external force may be applied to the inner surface 16 of the water cooling hole 13 by applying vibration or the like to the processing media 25 filled in the water cooling hole 13 to cause the processing media 25 to flow inside the water cooling hole 13. Even in this case, compressive residual stress may be applied to the inner surface 16 of the water cooling hole 13.

REFERENCE NUMERALS

1: processing apparatus, 12: second surface (surface of workpiece), 13: water cooling hole, 16: inner surface, 22: lifting unit, 23: hammer, 25: processing media, 28: external force applying device, 30 and 40: pressing member, 41: main body, 42: stirring pin, AX: central axis, F: load.

What is claimed is:
1. A processing method, comprising:
   preparing a metal workpiece having a hole that opens to a surface thereof;
   filling the hole with processing media; and
   applying an external force to the processing media to plastically deform an inner surface of the hole, thereby applying a compressive residual stress to the inner surface of the hole.

2. The processing method according to claim 1, further comprising:
   inserting a pressing member into the hole; and
   applying a load to the pressing member inserted into the hole to apply the external force to the processing media.

3. The processing method according to claim 2, further comprising dropping a hammer against the pressing member to apply the load to the pressing member.

4. The processing method according to claim 1, comprising stirring the processing media within the hole.

5. The processing method according to claim 1, further comprising filling the hole with a powder containing a metal material to be attached to the inner surface of the hole before applying the external force to the processing media.

6. The processing method according to claim 1, the hole is a water cooling hole of a mold.

7. The processing method according to claim 1, a tool mark on the inner surface of the hole is further removed during the application of the external force to the processing media.

* * * * *